United States Patent [19]

Huang et al.

[11] Patent Number: 5,405,638

[45] Date of Patent: * Apr. 11, 1995

[54] METHOD OF REDUCING PROCESSING TIME FOR RETORTED FOOD PRODUCTS

[75] Inventors: Victor T. Huang, Moundsview; Laurie E. Kerschner, Minnetonka; Lorri D. Cullen, Minneapolis, all of Minn.

[73] Assignee: Pillsbury Company, Minneapolis, Minn.

[*] Notice: The portion of the term of this patent subsequent to Apr. 20, 2010 has been disclaimed.

[21] Appl. No.: 943,274

[22] Filed: Sep. 10, 1992

Related U.S. Application Data

[63] Continuation-in-part of Ser. No. 821,208, Jan. 16, 1992, Pat. No. 5,204,135.

[51] Int. Cl.$^6$ ................................................. A23L 1/39
[52] U.S. Cl. ................................ 426/589; 426/399; 426/401; 426/578; 426/658
[58] Field of Search ............... 426/589, 578, 658, 399, 426/401

[56] References Cited

U.S. PATENT DOCUMENTS

| | | | |
|---|---|---|---|
| 3,257,214 | 6/1966 | McDermott | 99/182 |
| 3,480,450 | 11/1969 | Edlin et al. | 99/187 |
| 3,969,340 | 7/1976 | Tessler et al. | 260/233.3 R |
| 4,220,671 | 2/1980 | Kahn et al. | 426/321 |
| 4,291,066 | 9/1981 | Anema et al. | 426/578 |
| 4,415,599 | 11/1983 | Bos | 426/578 |
| 4,426,395 | 1/1984 | Sakai et al. | 426/46 |
| 4,568,555 | 2/1986 | Spanier | 426/582 |
| 4,597,974 | 7/1986 | Fonteneau et al. | 426/129 |
| 4,597,976 | 7/1986 | Doster et al. | 426/325 |
| 4,704,294 | 11/1987 | Rakosky | 426/578 |
| 5,008,124 | 4/1991 | Wilson | 426/589 |
| 5,204,135 | 4/1993 | Huang et al. | 426/589 |

FOREIGN PATENT DOCUMENTS

| | | |
|---|---|---|
| 0258957 | 3/1988 | European Pat. Off. . |
| 1041519 | 9/1966 | United Kingdom . |
| 1478843 | 7/1987 | United Kingdom . |

OTHER PUBLICATIONS

Messina & Pape, "Ingredient Cuts Heat Process Time," *Food Engineering*, pp. 48–51, Apr. 1966.

*Primary Examiner*—Jeanette Hunter
*Attorney, Agent, or Firm*—Merchant, Gould, Smith, Edell, Welter & Schmidt

[57] ABSTRACT

A sauce composition is provided which is suitable for preparing firm textured starch-containing or vegetable products wherein said products are retorted in the sauce. The sauce composition in addition to the normal ingredients of spices, flavors, water, and other compounds contains by weight 0.1%–24% polysaccharides having a $MW_w$ in the range of about 3,600 and 250,000. These polysaccharides include starch hydrolysates, and other polysaccharides such as alginates and carboxymethyl cellulose. Further, by using the sauce of the present invention, processing times are reduced.

38 Claims, 3 Drawing Sheets

METHOD OF REDUCING PROCESSING TIME FOR RETORTED FOOD PRODUCTS

CROSS-REFERENCE TO RELATED APPLICATIONS

This is a continuation-in-part of application Ser. No. 07/821,208, filed on Jan. 16, 1992, now U.S. Pat. No. 5,204,135.

BACKGROUND OF THE INVENTION

It is commonly known that upon retorting in sauces starchy foods such as pasta, rice, or vegetables lose their structural integrity. The foods become mushy, agglomerate and lose their structural appeal.

Firm or non-mushy macaroni, vegetable and rice textures are highly desirable for consumer acceptance in retorted food products. However, due to the severe high temperature, pressure and length of heating, fine textural attributes of macaroni, rice and vegetables are difficult to achieve.

Various attempts have been made to overcome the textural problem in retortable foods. Most efforts have been directed toward reformulating the composition of the starchy food component of the retortable foods without reformulating the sauces in which the starchy food is admixed. While this approach has worked reasonably well, it has not entirely solved the problem.

Less successful efforts have been attempted in engineering sauces used in retortable foods in order to increase the firmness of the starchy food or vegetable retorted therein. U.S. Pat. No. 4,597,976 discusses reformulating the sauce in order to improve the textural properties of the retorted food product. The '976 patent specifies acidifying the sauce to a pH of less than 4.6 to reduce retort time and thus limit textural degradation of the starchy component of the food product.

The present invention, a sauce which preserves the physical integrity of starchy foods and vegetables retorted therein is a great improvement over the existing art. Further, a sauce which does not require reformulated starch components nor an acidified pH to enhance firmness in retortable pasta, rice, and vegetables is new and unique. The invention sauce is most effective in preserving the structural integrity of foods which absorb significant amounts of water during retort. Accordingly, the invention works best when admixed with dehydrated or dried foods.

SUMMARY OF THE INVENTION

A sauce composition has been discovered which when used in retortable food products in admixture with starchy foods and vegetables preserves the structural integrity of the retorted starchy foods and vegetables. An advantage of this invention is to provide a product which has a higher tolerance to retort conditions. It is yet another advantage of this invention to provide a sauce which when combined with a starchy food or vegetable does not require the starchy food or vegetable to be reformulated in order to remain firm after retort. A further advantage of the invention is that the rate of heat transfer through a food product admixed with the invention sauce is significantly increased as compared to foods admixed with known sauces. As a result, processing times are surprisingly reduced when retorting foods admixed with the invention sauce.

The sauce of the present invention, along with spices, flavorings, and other ingredients normally included in sauces used with starchy foods or vegetables is comprised of about 0.1–20% polysaccharides by weight. The polysaccharides have a weight average molecular weight ($MW_w$) in the range of about 3600 to about 250,000. Examples of these compounds include starch hydrolysates of 1 to 20 DE (dextrose equivalent) which are normally called maltodextrins or compounds from the group of low molecular weight alginates or carboxymethyl cellulose (CMC).

Sauces prepared according to the present invention may be used for retorted foods such as spaghetti, vegetables with cheese sauces, Mexican-style rice foods, or gravies for stews or dumplings to name a few.

DETAILED DESCRIPTION OF THE INVENTION

Figure 1:
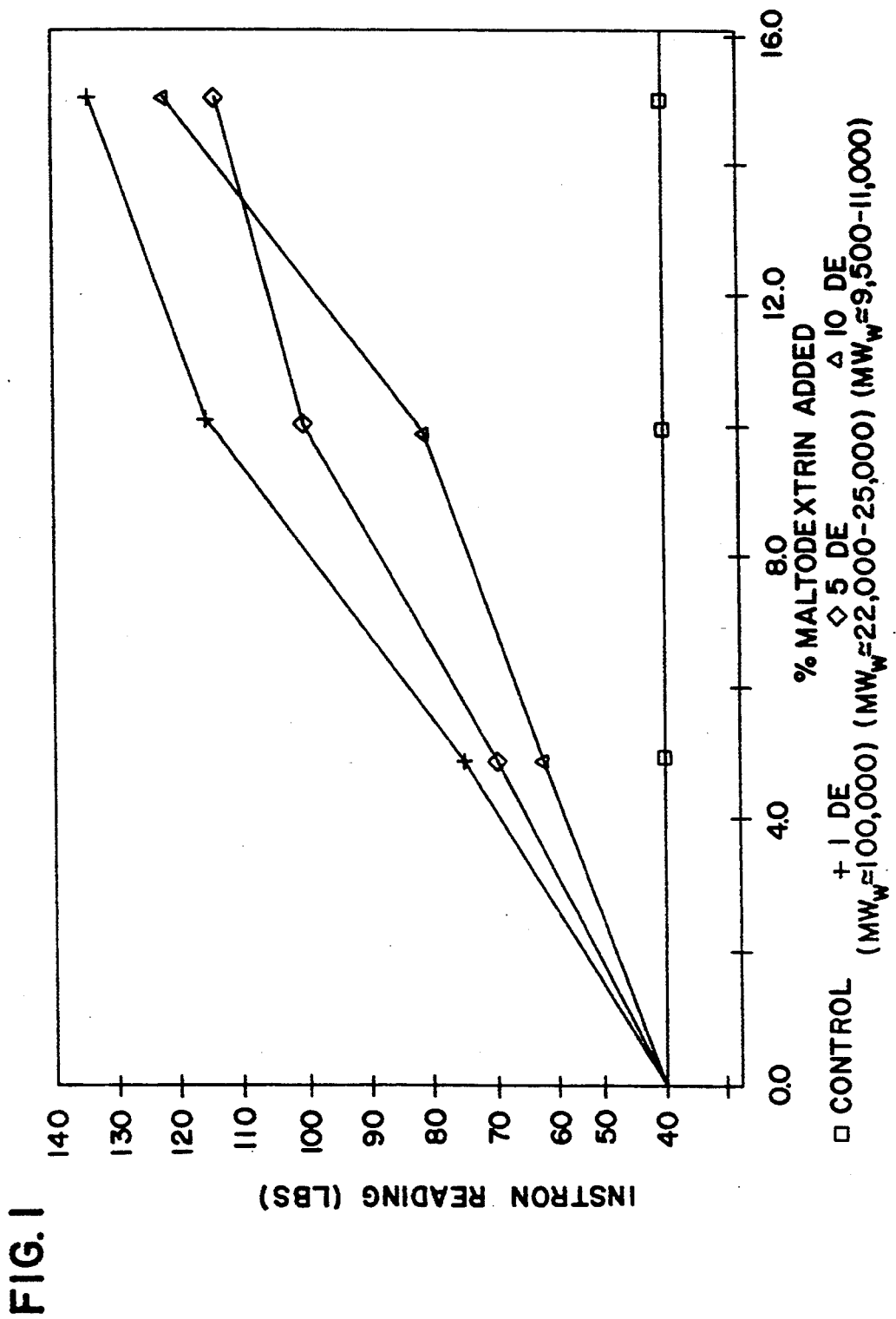
FIG. 1 is a graph illustrating the effect of maltodextrin-containing sauces on retorted pasta texture.

The advantage of using the sauce of this invention is that when the sauce is combined with foods to be thermally treated the foods will remain intact without excessive stickiness and agglomeration and will remain firm until the time of mastication. The sauces of this invention are suitable for retorting with starch-containing food components such as rice, pasta and flour-based foods (dumplings). The sauces of this invention are also suitable for retorting with vegetables such as potato, carrot, and beans, and may be used with any vegetable whose textural quality is degraded during thermal treatment. A further advantage of the invention is that when foods admixed with the sauce of the present invention are retorted under normal retort conditions the rate of heat transfer through the mixture is significantly increased as compared to controls. In other words, processing times required to reach commercially acceptable sterility are surprisingly reduced when retorting foods admixed with the sauce of the invention. For the purposes of this disclosure, foods admixed with the invention sauce are food products. For the purposes of this disclosure, commercial sterility or lethality is defined as the point when the bacterial load of the most-resistant botulinum spores has been reduced to $10^{-12}$ in a given food product (commonly known in the art as 12D).

Maltodextrin as used in this invention is defined as starch hydrolysates of less than 20 dextrose equivalents (DE) which correlates to a weight average molecular weight ($MW_w$) of greater than about 3600. Starch hydrolysates of greater than or equal to 20 DE have a $MW_w$ of less than 3600 and are known as corn syrups. Maltodextrins of various molecular weights are available commercially and may be purchased for example from A. E. Staley Manufacturing Company (Decatur, Ill.). Staley reports the viscosity of 1 DE through 20 DE maltodextrin at about 25 centipoise (cps) when in solution in water ranging from 10% to 30% by weight. Staley measured the viscosity with a Brookfield Viscometer, Model RV (Brookfield Engineering Labs, Stoughton, Mass.) at 100 degrees F. at 20 rpm after rotating for 30 seconds using spindle #1.

Examples of other polysaccharides suitable for this invention include alginates such as propylene glycol alginate or sodium alginate which have $MW_w$ in the range of 50,000 to 125,000 and are derived from algae. According to the manufacturer's (Kelco of San Diego, Calif.) specifications, alginate of 75,000 $MW_w$ has a viscosity of 1,200 cps when placed in 2% by weight solution in water at 25 degrees C. when measured with a Model LV Brookfield Viscometer at 60 rpm with the spindle #4. Alginate of 125,000 $MW_w$ has a viscosity of 7,000 cps when measured under the same conditions with spindle #6.

Further examples of polysaccharides suitable for this invention include carboxymethyl celluloses such as sodium carboxymethyl cellulose with 90,000 to 250,000 $MW_w$ which may be purchased for example from Aqualone of Wilmington, Del. According to Aqualone, carboxymethyl celluloses of 90,000 $MW_w$ have a viscosity of 25-50 cps when placed in 2% solution by weight in water and measured with a Brookfield Viscometer at 25 degrees C. with spindle #1 at 60 rpm after rotating for 3 minutes. Carboxymethyl celluloses of 250,000 $MW_w$ have a viscosity of 400-800 cps when placed in 2% solution by weight in water when measured with spindle #2 with a Brookfield Viscometer at 30 rpm after 3 minutes of rotating.

Preferably, the sauce of the present invention is formulated such that compounds are added which increase the average molecular weight of the water soluble components without becoming too viscous. To practice the invention, greater than 0.1% by weight of a polysaccharide having a molecular weight between 3600 and 250,000 is added to the sauce composition. The molecular weight of the compound cannot be so high that the sauce is no longer an effective plasticizer for the dry component. Conversely, the molecular weight cannot be so low that the sauce becomes unsuitably sweet for pasta, rice, and vegetable dishes. Preferably, between about 5% and 24% maltodextrin having a $MW_w$ between 3600 and 100,000 (1DE maltodextrin) or between about 0.1% and 4% alginate having a $MW_w$ between 50,000 and about 125,000 or between about 0.1% and 4% carboxymethyl cellulose having a $MW_w$ in the range of 90,000 to 250,000 is added to the sauce. The invention anticipates that different polysaccharides may be combined in the sauce to reach up to about 20% by weight or in the alternative a single type of polysaccharide may be used.

Any type or flavor of sauce normally added to starchy foods or vegetables may be formulated in accordance with the invention. Examples of such sauces include but are not limited to cheese sauces, tomato sauces, gravies and cream sauces. Likewise, any spices or flavorings normally included in starchy food or vegetable sauces may be added to the invention sauce formulation. An example of a cheese sauce of the present invention which contains seasonings and spices is as follows:

| Ingredient | % by Weight |
| --- | --- |
| Water-Polysaccharide Solution | 81.07 |
| Instant Starch | 2.50 |
| Salt | 0.40 |
| Cheese Sauce Powder | 16.00 |
| Beta-carotene | 0.03 |

Instant starch may be purchased from National Starch Company (Bridgewater, N.J.), cheese sauce powder may be purchased from Kraft General Foods (Memphis, Tenn.), and beta-carotene may be purchased from Hoffman-La Roche (Clifton, N.J.). Generally, seasonings and spices may be added to the sauce up to about 40% by weight of the sauce.

While not intending to be bound by theory, the following is put forth to possibly explain the favorable results of the present invention. Water and water soluble compounds such as maltodextrins act as plasticizers to higher molecular weight polymeric compounds such as starch and glutens. Adding polysaccharides of the $MW_w$ of the invention to a retortable sauce increases the effective molecular weight of the plasticizing system which thereby reduces the sauce's plasticizing ability. Once the plasticizing ability is reduced, the diffusion rate of water into the starchy matrix of the product during retorting is also reduced. Additionally, the gelatinization temperature of starch in the system is increased which reduces the overall degree of softening during thermal treatment. This approach is very effective for any food product which takes up significant amounts of water during a retort operation. Therefore, the invention is most effective in preserving the structural integrity of dehydrated foods since dehydrated foods are more capable of absorbing large amounts of water as compared to their hydrated counterparts. In this invention, a dehydrated food is defined as a food having a reduced moisture content as compared to the natural moisture content of the food.

An unexpected advantage of the present invention is that the rate of heat transfer is increased when retorting foods admixed with the sauce of the invention. It was surprisingly found that samples containing the sauce of the present invention had heat transfer rates about 4 times greater as compared to the control samples when all samples were treated for the same time at the same temperature. Thus, an advantage of the present invention is that retort times may be reduced while still achieving an acceptable level of commercial sterility or lethality in the food sample.

Benefits of the invention include increased manufacturer productivity since each retort takes less time along with decreased cost of production. Increased product quality also results from practicing the invention because foods become sterile within a shorter retort time, the foods do not lose their texture as readily as under more severe retort times.

An unexpected advantage of the invention is contrary to commonly held beliefs. The above observation, that heat is transferred more efficiently through the invention sauce is surprising. One would expect that when a high molecular weight polysaccharide is added to a sauce that the viscosity of the sauce would increase. During retort one would further expect water to be absorbed by the starchy food thereby leaving less water in the sauce and causing the sauce to become more viscous. A more viscous sauce would not allow heat to penetrate the sauce as readily as a less viscous sauce. For the retort conditions having the same time and temperature, a more viscous sauce would result in lower heat transfer rate and commercial sterility would therefore be reached in a longer amount of time. As stated above, the sauce of the invention acts contrary to these expectations.

EXAMPLES

The sauce of the present invention was added to pasta, rice, carrots, potatoes, and kidney beans to test the firmness after retort. For Examples 1 through 4, 1DE, 5DE, and 10DE maltodextrins ($MW_w$s range from 100,000 to 9,500) were added separately to water in the amounts up to about 18% by weight in order to make the sauces. The sauces of Examples 5 were prepared using up to about 2% by weight of alginate ($MW_w$ of 50,000 to 125,000), while the sauces of Example 6 were prepared using up to about 2% carboxymethyl cellulose by weight ($MW_w$ of 90,000 to 250,000).

For the pasta, rice and carrots, firmness measurements were done using the Kramer Shear Press (Kramer et al., "A Device for Measuring Food Quality", The Canner, Feb. 3, 1951, pp 34–36) equipped with a loading cell of 500 kg which was attached to an Instron Universal Testing Instrument (Model TT-C; Canton, Mass). One to three replicates were measured on each product. All measurements were at room temperature (72 degrees F.) and the crosshead speed was 5 inches per minute.

For the kidney bean samples firmness measurements were done as described in Example 4 below.

Figure 2:
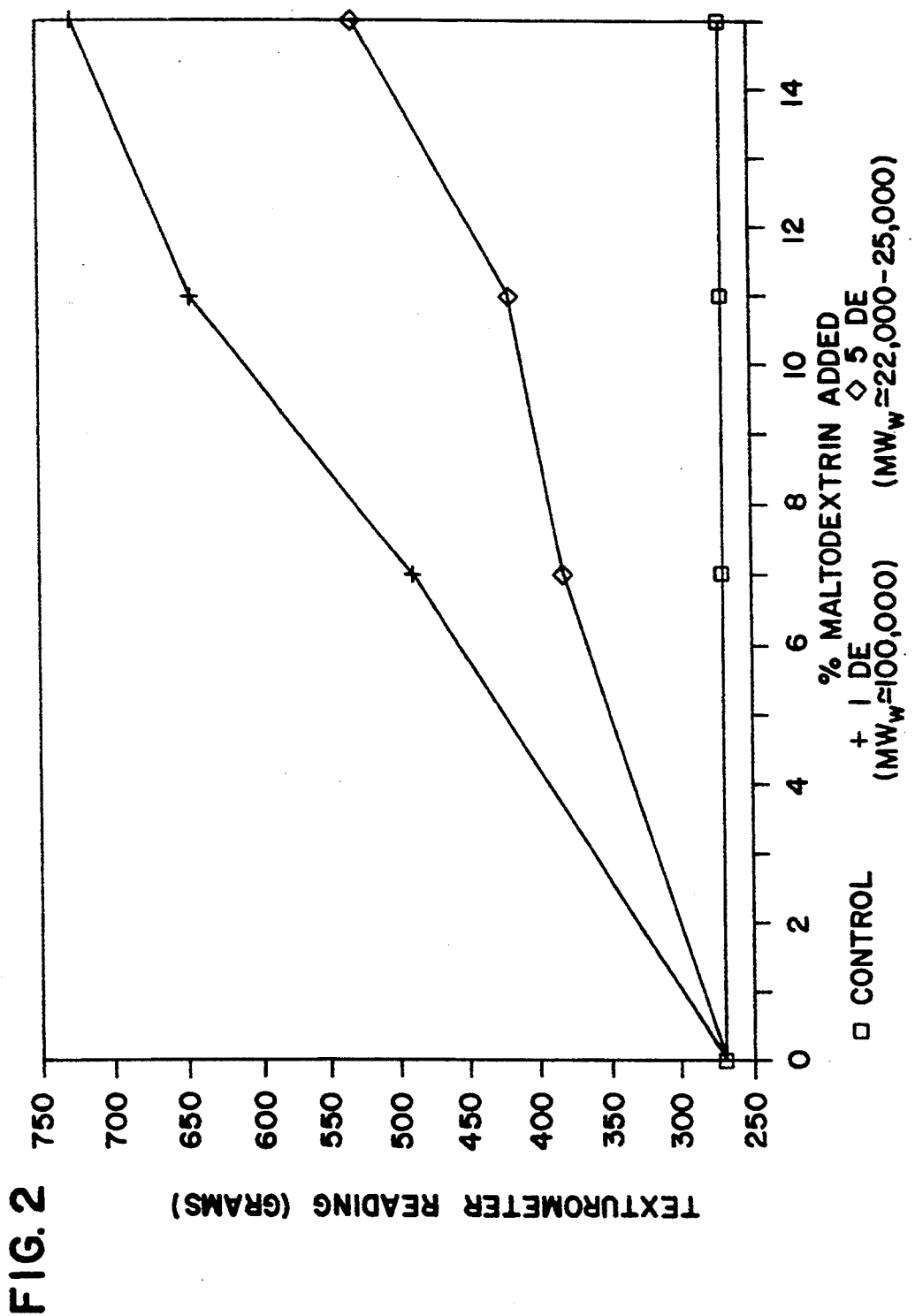
FIG. 2 is a graph illustrating the effect of maltodextrin-containing sauces on retorted kidney bean texture.
Figure 3:
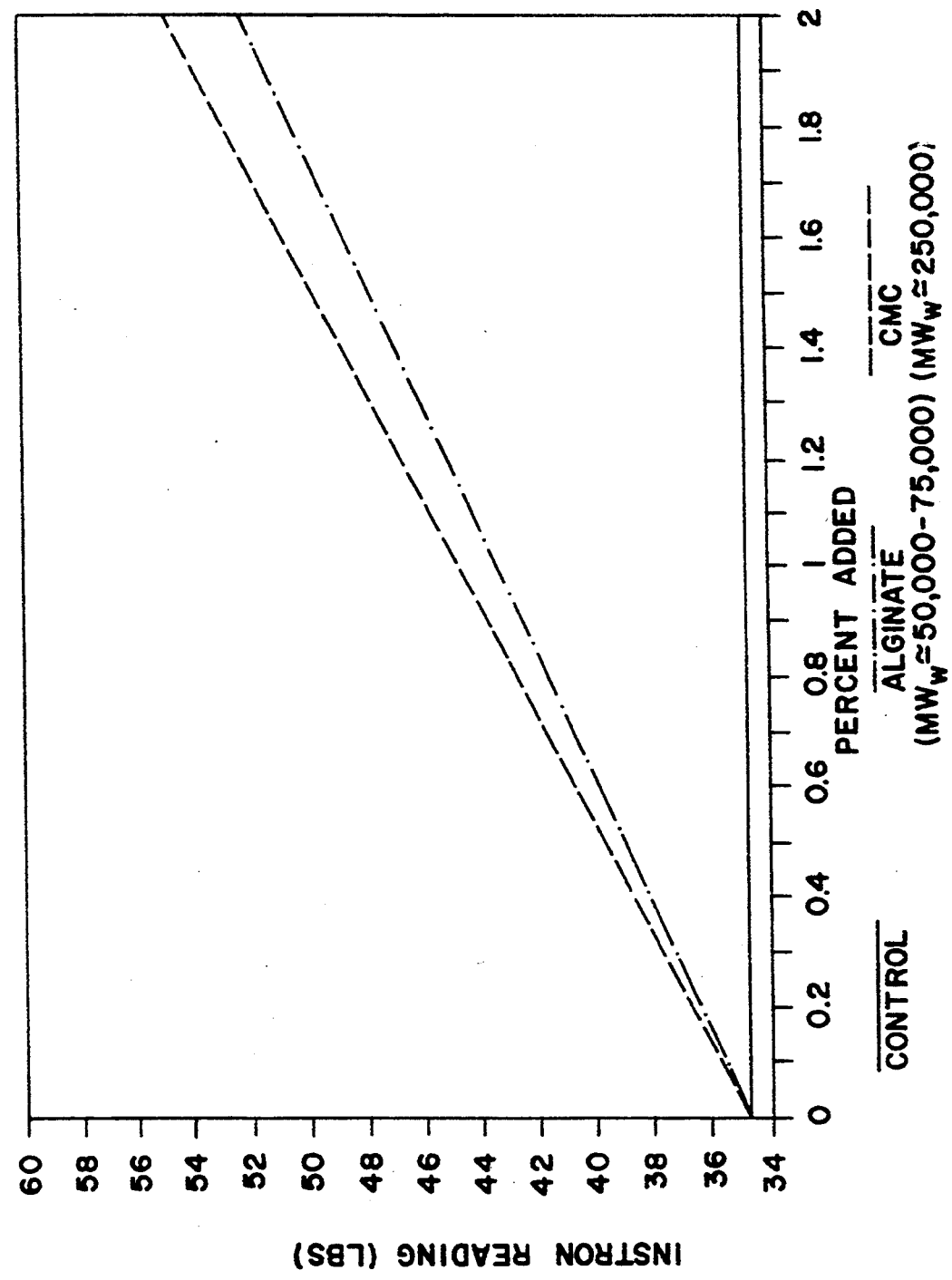
FIG. 3 is a graph illustrating the effect of alginate and carboxymethyl cellulose-containing sauces on retorted pasta texture.

Examples 1 through 6 demonstrated that significant improvement in the textural quality of the retorted starchy food or vegetable was obtained when the sauce of the invention was added to starchy foods or vegetables before retort. FIG. 1 and FIG. 2 are representative of the firmness results of retorting all starchy foods and vegetables admixed with the sauce of the invention. FIG. 1 reflects the firmness of pasta combined with maltodextrin-containing sauce and retorted. FIG. 2 reflects the firmness of kidney beans admixed with maltodextrin-containing sauce and retorted. Similar firmness data resulted no matter what food was admixed with the invention sauce and then retorted. Likewise, similar firmness data resulted no matter what polysaccharide was used to formulate the sauce of the invention as can be seen when comparing FIGS. 1 and 2 with FIG. 3. FIG. 3 shows the firmness of pasta when retorted in alginate and CMC-containing sauces.

Firmness of the food retorted in the sauce was dependent upon the concentration of the polysaccharide placed in the sauce. The more polysaccharide which was added to the sauce, the firmer the food retorted therein became. Results coincided when maltodextrin, alginate, and carboxymethyl cellulose were used to formulate the sauce and admixed with food before retort. Notably, all samples which contained polysaccharide-containing sauces displayed marked textural quality improvement over the control.

Example 7 demonstrates that the rate of heat transfer is increased when foods which are admixed with the sauce of the invention are retorted.

EXAMPLE 1

The texture of retorted pasta was tested using a maltodextrin-containing sauce.

Pasta was pretreated by placing 33% dry pasta by weight in 67% water at 190° F. and soaking the pasta for 3 minutes. Excess water was then drained and the pasta was weighed. To the pasta 2% soy oil by weight was added, the pasta was then tossed to coat. Sixty-five parts of each of the maltodextrin-containing sauces were then individually combined with 35 parts of the pretreated pasta. A control sample was prepared in which only water was added to the pasta in the ratio of 65 parts water to 35 parts pasta.

The pasta samples combined with the sauces were packaged into ½ pint Mason jars and heated in a Mirro (Manitowoc, Wis.) stove top pressure cooker for 25 minutes at 15 PSI at about 250 degrees F. The retorted jars were removed from the cooker after 45 minutes of cool down time.

Kramer Shear Press firmness measurement as described above was performed on 140 grams of the pasta samples after overnight storage at room temperature and the results are shown in FIG. 1.

EXAMPLE 2

The textural quality of retorted rice with maltodextrin-containing sauce was tested.

Rice was pretreated by placing 33% dry rice by weight in 67% water at 190° F. and soaking for 5 minutes. Excess water was drained and the rice was weighed. 2% soy oil by weight of the rice was added to the rice and the rice was tossed until coated. The maltodextrin-containing sauces were then individually combined with the pretreated rice in the ratio of 73 parts sauce to 27 parts rice. A control sample was also prepared in which only water was added to the rice in place of the maltodextrin-water sauce. Thus, the control consisted of 73 parts water and 27 parts rice.

The rice samples combined with the sauces were packaged and retorted as described in Example 1.

To test the firmness of rice, the Shear Extrusion Adaptor manufactured by Food Technology Corporation (Rockville, Md.) with round shear cell was added to the Kramer Shear Press. Firmness measurement was performed on 130 grams of the samples after overnight storage at room temperature. The results were similar to those obtained in Example 1 wherein the rice samples combined with maltodextrin-containing sauces showed marked textural improvement as compared to the control. Also, the higher the molecular weight of the maltodextrin which was added to the sauce, the firmer the rice which was retorted therein.

EXAMPLE 3

The textural quality of retorted dehydrated carrots with a maltodextrin-containing sauce was also tested.

The sauces were individually combined with dehydrated carrot at the ratio of 90 parts sauce to 10 parts carrot to form the samples. A control sample was prepared in which only water was added to the carrots in place of the maltodextrin-containing sauce, thus 90 parts water and 10 parts dehydrated carrot were combined for the control.

The carrot samples combined with the sauces were packaged as described in Example 1. The retort conditions were the same as Example 1 except the carrot samples were only retorted for 10 minutes. Dehydrated carrots were retorted for a shorter time because they are more sensitive to retort conditions than the other foods tested.

Firmness measurements were done on 175 grams of the carrot samples after overnight storage at room temperature using a Kramer Shear Press as described above. Results followed the same trend described in Example 3.

EXAMPLE 4

The textural quality of retorted kidney beans were tested using a maltodextrin-containing sauce.

Maltodextrin-containing sauces were added to dehydrated kidney beans in the ratio of 50 parts kidney beans to 50 parts sauce. A control was prepared in which 50 parts water was added to 50 parts kidney beans, no maltodextrin was added to the control. Kidney bean samples combined with sauces were packaged and retorted as described in Example 1. Kidney bean firmness measurements were done using the Stevens L.F.R.A. Analyzer Model TA-1000 (Scarsdale, N.Y.). Ten beans from each sample were placed on a platen with a wedge cut lengthwise into its surface. The bean was positioned in the wedge so as to keep the bean steady when it was cut.

A plastic blade which was longer than the length of the bean and had a beveled edge was used to cut the bean. The operating mode of the analyzer was normal and the crosshead speed of the blade was 0.5 mm/sec with the blade cutting 5 mm into the bean or through one cotyledon. Data were recorded on a chart recorder with a chart speed of 20 cm/min. Peak force reading in grams were taken from the highest peak after the initial peak since the initial peak was thought to be the result of breaking through the skin and not a true measurement of the inside texture of the bean. Results of the firmness measurements are summarized in FIG. 2.

EXAMPLE 5

The textural quality of pasta after retort was tested using alginate-containing sauces. Pasta was chosen as the sole example for alginate-containing sauces because retorted pasta historically causes the largest textural problems of any retorted foods.

Pasta was pretreated as described in Example 1. Samples were prepared in the ratio of 65 parts alginate-containing sauce and 35 parts pasta. A control was prepared in which water was added in place of the alginate-containing sauce, thus the control consisted of 65 parts water and 35 parts pasta.

The samples were packaged, retorted and firmness measurements were done using a Kramer Shear as outlined in Example 1. The result of admixing 50,000–75,000 $MW_w$ alginate with pasta and then retorting is shown in FIG. 3.

EXAMPLE 6

The textural quality of pasta after retort was tested using carboxymethyl cellulose-containing sauce. Pasta was chosen as the sole example for carboxymethyl cellulose-containing sauces because pasta historically causes the largest textural problems of any retorted foods.

Pasta was pretreated as described in Example 1. Samples were prepared in the ratio of 65 parts carboxymethyl cellulose-containing sauce and 35 parts pasta. A control was prepared in which water was added in place of the carboxymethyl cellulose-containing sauce, thus the control consisted of 65 parts water and 35 parts pasta.

The samples were packaged, retorted and firmness measurements were done using a Kramer Shear Press as outlined in Example 1. The carboxymethyl cellulose-containing sauces followed the same trend as the maltodextrin-containing sauces with respect to the firmness of the food retorted therein as shown in FIG. 3.

EXAMPLE 7

The rate of heat transfer in retorted foods were compared by individually admixing food with a maltodextrin-containing sauce of the invention and also with a control sauce and then retorting the admixed combinations under identical conditions. The invention sauce had the following formula:

| Ingredient | % by weight |
| --- | --- |
| Water | 68.91 |
| 1 DE Maltodextrin | 12.16 |
| Cheese Powder | 16.00 |
| Starch | 2.50 |
| Salt | 0.4 |
| Beta carotene | 0.03 |

The control sauce was comprised of:

| Ingredient | % by weight |
| --- | --- |
| Water | 78.45 |
| Cheese Powder | 18.21 |
| Starch | 2.85 |
| Salt | 0.46 |
| Beta-carotene | 0.03 |

Pasta was pretreated as described above in Example 1. About 240 g of both sauces were individually admixed with about 85 g pasta and placed in 16 ounce polypropylene tubs. A thermocouple was inserted into the geometric center of each sample and heat penetration data was obtained. The combinations were then retorted for about 30 minutes at about 35 p.s.i. and at about 250° F. in a rotating water cooker, Rotopax 1300 manufactured by Allpax Products, Inc. of Metairie, La. The Ball Method, developed by C. O. Ball and published in *Sterilization and Food Technology* (1957) was used to calculate the rate of heat transfer or the rate of heat penetration.

It was surprisingly found that samples containing the sauce of the present invention had substantially higher heat transfer rates as compared to the control samples. The time required to reach commercial sterility for the foods admixed with the invention sauce was almost half the time required to reach commercial sterility in the controls.

We claim:

1. A method of reducing time to reach commercial sterility in food products, by increasing the heat transfer rate of a sauce up to four times the heat transfer rate of a control sauce that contains no polysaccharide, said method comprising the steps of:
   (a) combining said sauce and a food to obtain a food product wherein said sauce comprises:
      (i) about 0.1% to about 24% by weight of a polysaccharide having a $MW_w$ in the range of about 3,600 to about 250,000;
   (b) combining said sauce and said food in a ratio suitable for said food products; and
   (c) heating said food product to a point of commercial sterility.

2. The method of claim 1 wherein the polysaccharide has a viscosity of up to about 7,000 cps when placed in 2% solution by weight in water at 25 degrees C. at 60 rpm when measured with a Brookfield Viscometer with spindle #6.

3. The method of claim 1 wherein the polysaccharide is selected from the group consisting of starch hydrolysates of about 1 DE to 20 DE with a $MW_w$ between about 100,000 and 3,600.

4. The method of claim 1 wherein the polysaccharide is alginate with a $MW_w$ of between about 50,000 and 125,000.

5. The method of claim 1 wherein the polysaccharide is carboxymethyl cellulose with a $MW_w$ of between about 90,000 and 250,000.

6. The method of claim 1 wherein flavorings and spices are added to the sauce.

7. The method of claim 1 wherein the food is a starchy food.

8. The method of claim 1 wherein the food is a vegetable.

9. A method of achieving an increased heat transfer rate of a sauce up to four times the heat transfer rate of a control sauce that contains no polysaccharide without increasing temperature or pressure, said method comprising the steps of:
  (a) combining said sauce and a food to obtain a food product wherein said sauce comprises:
    (i) about 0.1% to about 24% by weight of a polysaccharide having a $MW_w$ in the range of about 3,600 to about 250,000;
  (b) combining said sauce and said food in a ration suitable for the food product; and
  (c) heating said food product.

10. The method of claim 9 wherein the polysaccharide has a viscosity of up to about 7,000 cps when placed in 2% solution by weight in water at 25 degrees C. at 60 rpm when measured with a Brookfield Viscometer with spindle #6.

11. The method of claim 9 wherein the polysaccharide is selected from the group consisting of starch hydrolysates of about 1 DE to 20 DE with a $MW_w$ of between about 100,000 and 3,600.

12. The method of claim 9 wherein the polysaccharide is alginate with a $MW_w$ of between about 50,000 and 125,000.

13. The method of claim 9 wherein the polysaccharide is carboxymethyl cellulose with a $MW_w$ of between about 90,000 and 250,000.

14. The method of claim 9 wherein flavorings and spices are added to the sauce.

15. The method of claim 9 wherein the food is a starchy food.

16. The method of claim 9 wherein the food is a vegetable.

17. A food product comprising the sauce and the food resulting from the method of claim 1.

18. The food product of claim 17 wherein the polysaccharide has a viscosity of up to about 7,000 cps when placed in 2% solution by weight in water at 25 degrees C. at 60 rpm when measured with a Brookfield Viscometer with spindle #6.

19. The food product of claim 17 wherein the polysaccharide comprises a starch hydrolysates of about 1 DE to 20 DE with a $MW_w$ of between about 3,600 and 100,000.

20. The food product of claim 17 wherein the polysaccharide is alginate with a $MW_w$ of between about 50,000 and 125,000.

21. The food product of claim 17 wherein the polysaccharide is carboxymethyl cellulose with a $MW_w$ of between about 90,000 and 250,000.

22. The food product of claim 17 wherein flavorings and spices are added to the sauce.

23. The food product of claim 22 wherein the flavorings and spices are selected from the group consisting of salt, pepper, cheese sauce powder, meat flavoring, onion powder, tomato flavoring, cilantro, oregano, parsley, basil, chili powder, taco flavoring, lemon flavoring, garlic powder, and cayenne pepper powder.

24. The food product of claim 17 wherein the food is a starchy food.

25. The food product of claim 24 wherein the starchy food is selected from the group consisting of pasta, rice, and dumplings.

26. The food product of claim 17 wherein the food is a vegetable.

27. The food product of claim 26 wherein the vegetable is selected from the group consisting of potatoes, carrots, and beans.

28. A food product comprising the sauce and the food resulting from the method of claim 9.

29. The food product of claim 28 wherein the polysaccharide has a viscosity of up to about 7,000 cps when placed in 2% solution by weight in water at 25 degrees C. at 60 rpm when measured with a Brookfield Viscometer with spindle #6.

30. The food product of claim 28 wherein the polysaccharide is selected from the group consisting of starch hydrolysates of about 1 DE to about 20 DE with a $MW_w$ of between about 3,600 and 100,000.

31. The food product of claim 28 wherein the polysaccharide is alginate with a $MW_w$ of between about 50,000 and 125,000.

32. The food product of claim 28 wherein the polysaccharide is carboxymethyl cellulose with a $MW_w$ of between about 90,000 and 250,000.

33. The food product of claim 28 wherein flavorings and spices are added to the sauce.

34. The food product of claim 33 wherein the flavorings and spices are selected from the group consisting of salt, pepper, cheese sauce powder, meat flavoring, onion powder, tomato flavoring, cilantro, oregano, parsley, basil, chili powder, taco flavoring, lemon flavoring, garlic powder, and cayenne pepper powder.

35. The food product of claim 28 wherein the food is a starchy food.

36. The food product of claim 35 wherein the starchy food is selected from the group consisting of pasta, rice, and dumplings.

37. The food product of claim 28 wherein the food is a vegetable.

38. The food product of claim 37 wherein the vegetable is selected from the group consisting of potatoes, carrots, and beans.

* * * * *